US008560139B2

(12) United States Patent
Lee

(10) Patent No.: US 8,560,139 B2
(45) Date of Patent: Oct. 15, 2013

(54) AUTOMATIC FLOW CONTROL APPARATUS

(76) Inventor: Tung-Teh Lee, New Taipei (TW)

( * ) Notice: Subject to any disclaimer, the term of this patent is extended or adjusted under 35 U.S.C. 154(b) by 248 days.

(21) Appl. No.: 13/065,741

(22) Filed: Mar. 29, 2011

(65) Prior Publication Data

US 2011/0251729 A1 Oct. 13, 2011

(30) Foreign Application Priority Data

Apr. 9, 2010 (TW) .............................. 99111077 A

(51) Int. Cl.
| F16K 25/00 | (2006.01) |
| H02J 7/00 | (2006.01) |
| G05D 17/00 | (2006.01) |
| F16K 31/44 | (2006.01) |

(52) U.S. Cl.
USPC ............... 700/297; 251/73; 251/94; 251/172; 251/175; 320/101; 320/103; 320/106; 320/127; 320/128; 320/129; 320/130; 320/131; 320/132; 320/133; 320/134; 320/135; 320/136; 320/137

(58) Field of Classification Search
USPC .............. 251/73, 94, 172, 175; 320/101, 103, 320/106, 127–137; 700/297
See application file for complete search history.

(56) References Cited

U.S. PATENT DOCUMENTS

| 4,041,318 | A | * | 8/1977 | Poulsen ..................... 250/459.1 |
| 4,175,249 | A | * | 11/1979 | Gruber .......................... 323/271 |
| 4,245,499 | A | * | 1/1981 | Nguyen et al. ............. 73/170.17 |
| 4,259,864 | A | * | 4/1981 | Tavoni ....................... 73/170.16 |
| 4,364,239 | A | * | 12/1982 | Chapelle et al. ............. 62/235.1 |
| 4,714,352 | A | * | 12/1987 | Ganter ............................. 368/64 |
| 4,951,915 | A | * | 8/1990 | Piao ................................ 251/14 |
| 5,293,892 | A | * | 3/1994 | Fourqurean ....................... 137/3 |
| 5,937,941 | A | * | 8/1999 | Gach ............................. 165/204 |
| 6,050,779 | A | * | 4/2000 | Nagao et al. ..................... 417/28 |
| 6,134,891 | A | * | 10/2000 | Zaviska et al. ................... 60/648 |
| 6,267,298 | B1 | * | 7/2001 | Campbell ........................ 239/70 |
| 6,725,167 | B2 | * | 4/2004 | Grumstrup et al. ............. 702/47 |
| 7,191,597 | B2 | * | 3/2007 | Goldman ...................... 60/641.8 |
| 2002/0024332 | A1 | * | 2/2002 | Gardner .................... 324/103 R |
| 2002/0094010 | A1 | * | 7/2002 | Vail et al. ....................... 374/183 |
| 2003/0135335 | A1 | * | 7/2003 | Grumstrup et al. ............. 702/47 |
| 2005/0109394 | A1 | * | 5/2005 | Anderson ...................... 136/291 |
| 2006/0107944 | A1 | * | 5/2006 | Bourke ......................... 126/599 |
| 2006/0116102 | A1 | * | 6/2006 | Brown et al. ............... 455/343.1 |

(Continued)

FOREIGN PATENT DOCUMENTS

| CN | 1994056 A | 7/2007 |
| JP | 56044471 A | * 4/1981 |

(Continued)

Primary Examiner — Kavita Padmanabhan
Assistant Examiner — Thomas Stevens
(74) Attorney, Agent, or Firm — Schwegman Lundberg & Woessner, P.A.

(57) ABSTRACT

An automatic flow control apparatus includes a solar cell module that provides a received light signal, an energy storage module, a charging circuit, a regulating module, a control module, a rainfall detection module for generating a detected rainfall signal, and a pair of conductors. The control module converts the received light signal and the detected rainfall signal into measured light data and measured rainfall data, and stores a measured data set that includes the measured light data and the measured rainfall data. The controller determines based on at least the measured data set whether to output a control signal to the regulating module for controlling regulation of fluid flow.

9 Claims, 7 Drawing Sheets

(56) References Cited

U.S. PATENT DOCUMENTS

| | | |
|---|---|---|
| 2006/0151023 A1* | 7/2006 | Dubbeldam .................. 136/256 |
| 2006/0190140 A1* | 8/2006 | Soni .............................. 700/295 |
| 2006/0213209 A1* | 9/2006 | Tanaami et al. .............. 62/238.6 |
| 2007/0012041 A1* | 1/2007 | Goldman ...................... 60/641.8 |
| 2007/0138868 A1* | 6/2007 | Kokuryo et al. ............... 307/9.1 |
| 2009/0045361 A1* | 2/2009 | Nolle et al. ..................... 251/12 |
| 2009/0120506 A1* | 5/2009 | Hoch ........................... 137/78.2 |
| 2010/0314070 A1* | 12/2010 | Yang ................................ 165/45 |
| 2012/0036091 A1* | 2/2012 | Cook ............................ 705/412 |

FOREIGN PATENT DOCUMENTS

| | | | |
|---|---|---|---|
| JP | 61046846 A | * | 3/1986 |
| TW | 200904323 A | | 2/2009 |
| WO | WO 2009113954 A1 | * | 9/2009 |

* cited by examiner

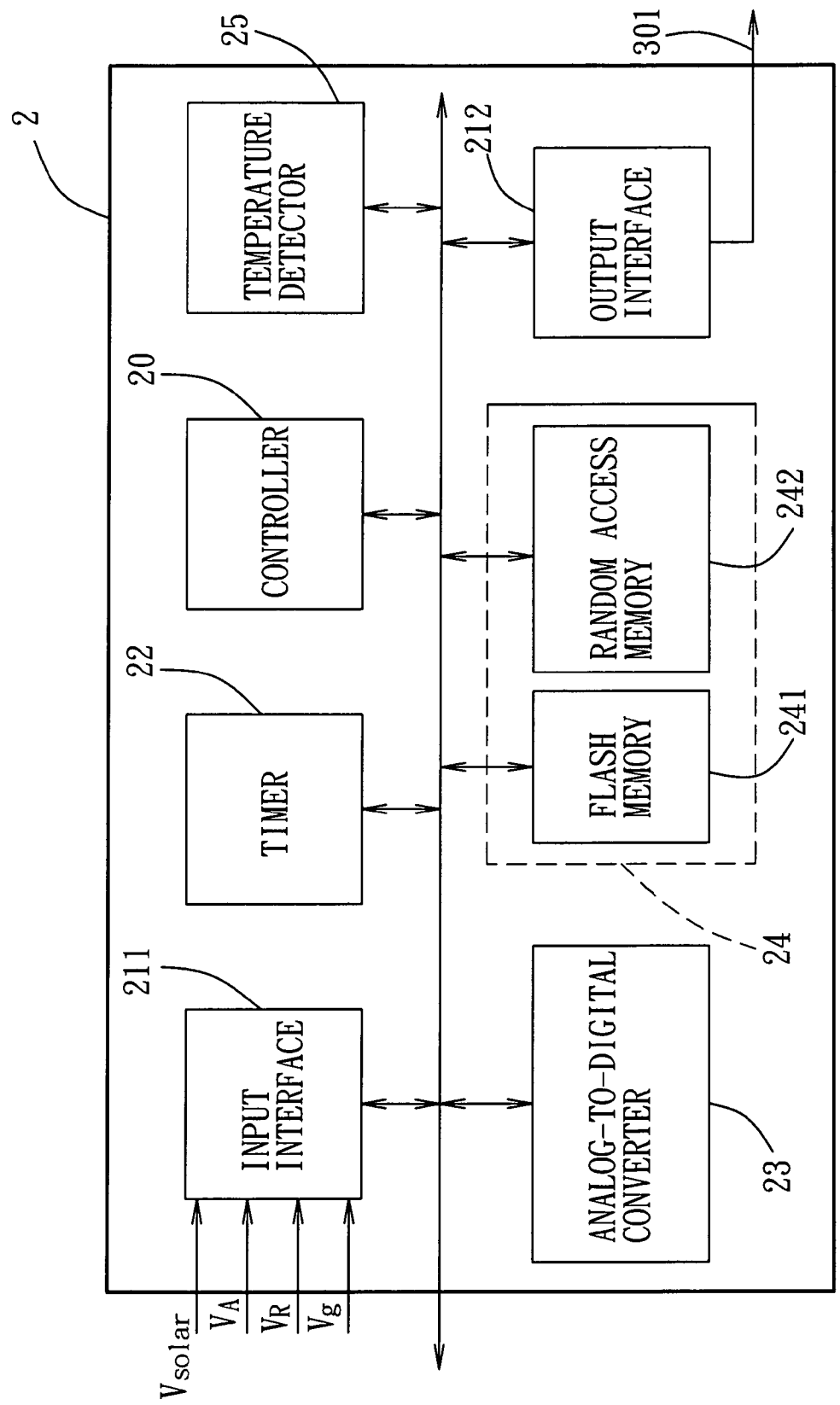
F I G. 2

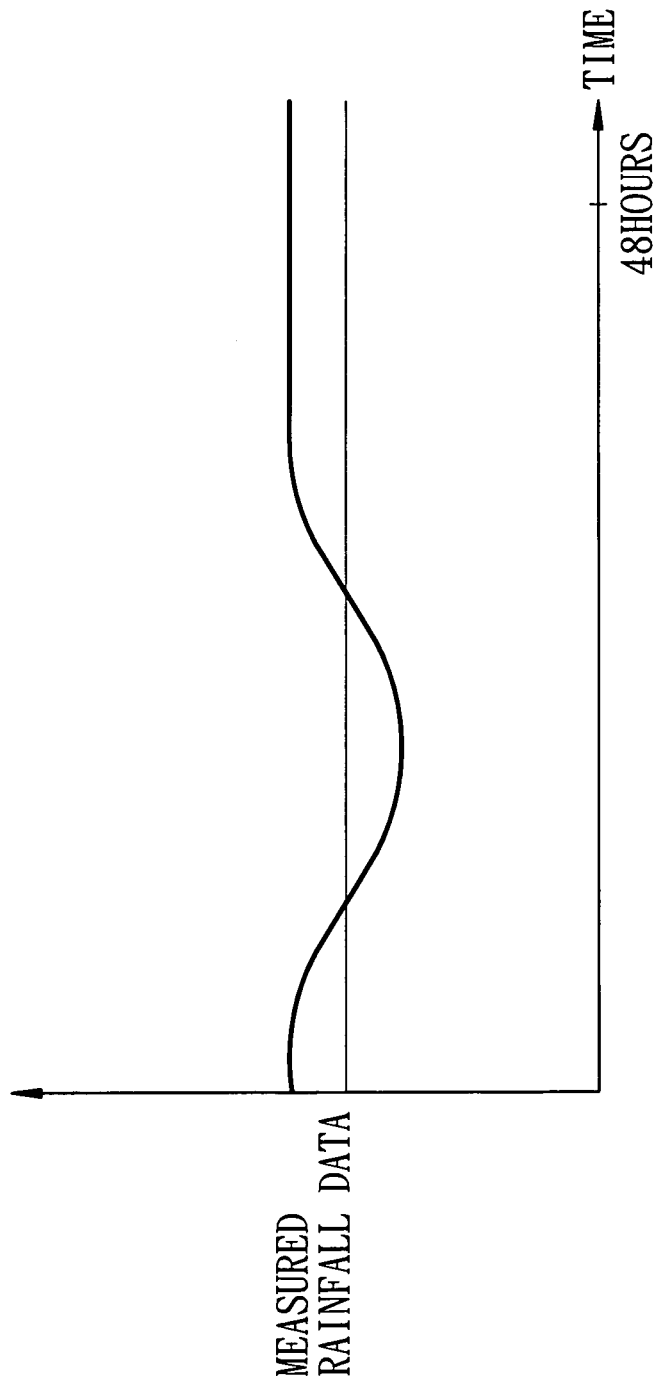
F I G. 4

AUTOMATIC FLOW CONTROL APPARATUS

CROSS-REFERENCE TO RELATED APPLICATION

This application claims priority to Taiwanese application no. 099111077 filed on Apr. 9, 2010.

BACKGROUND OF THE INVENTION

1. Field of the Invention

The invention relates to flow control, and more particularly to an automatic flow control apparatus.

2. Description of the Related Art

A conventional flow control apparatus may require complicated manual configuration to operate, which may cause the conventional flow control apparatus to permit fluid flow unnecessarily, or to fail to permit fluid flow when needed. Accordingly, improvements may be made over the conventional flow control apparatus.

SUMMARY OF THE INVENTION

An object of an embodiment of the present invention is to provide an automatic flow control apparatus that detects light and controls fluid flow based on the detected light.

An automatic flow control apparatus according to the present invention includes a solar cell module that converts received light energy into electricity, and that provides a received light signal corresponding to the received light energy. The automatic flow control apparatus further includes an energy storage module for storing and supplying electricity. The automatic flow control apparatus also includes a charging circuit that is coupled to the solar cell module and the energy storage module and that charges the energy storage module using the electricity from the solar cell module. The automatic flow control apparatus includes a regulating module having a driving circuit and a regulator valve. The driving circuit is responsive to a control signal to generate a drive signal, and the regulator valve is coupled to the driving circuit and is responsive to the drive signal for regulating fluid flow.

The automatic flow control apparatus further includes a control module having a controller, an input interface, an analog-to-digital converter, a memory, and an output interface. The input interface is configured to receive the received light signal from the solar cell module. The analog-to-digital converter is coupled to the controller and the input interface and is controlled by the controller to convert the received light signal from the input interface into measured light data. The memory is coupled to the controller and configured for storing a measured data set that includes the measured light data obtained during a first predetermined time period. The output interface is coupled to the driving circuit. The controller is configured to operate in a normal mode to determine based on at least the measured data set in the memory whether to output the control signal through the output interface to the regulating module for controlling regulation of the fluid flow by the regulator valve.

An advantage of the automatic flow control apparatus is that the output of a solar cell during a predetermined time period may be used to control fluid flow.

BRIEF DESCRIPTION OF THE DRAWINGS

Other features and advantages of the present invention will become apparent in the following detailed description of the preferred embodiments with reference to the accompanying drawings, of which:

FIG. 2 is a system block diagram illustrating components of a control module of the preferred embodiment;

FIG. 4 is a graph of measured rainfall data versus time;

DETAILED DESCRIPTION OF THE PREFERRED EMBODIMENTS

Figure 1:
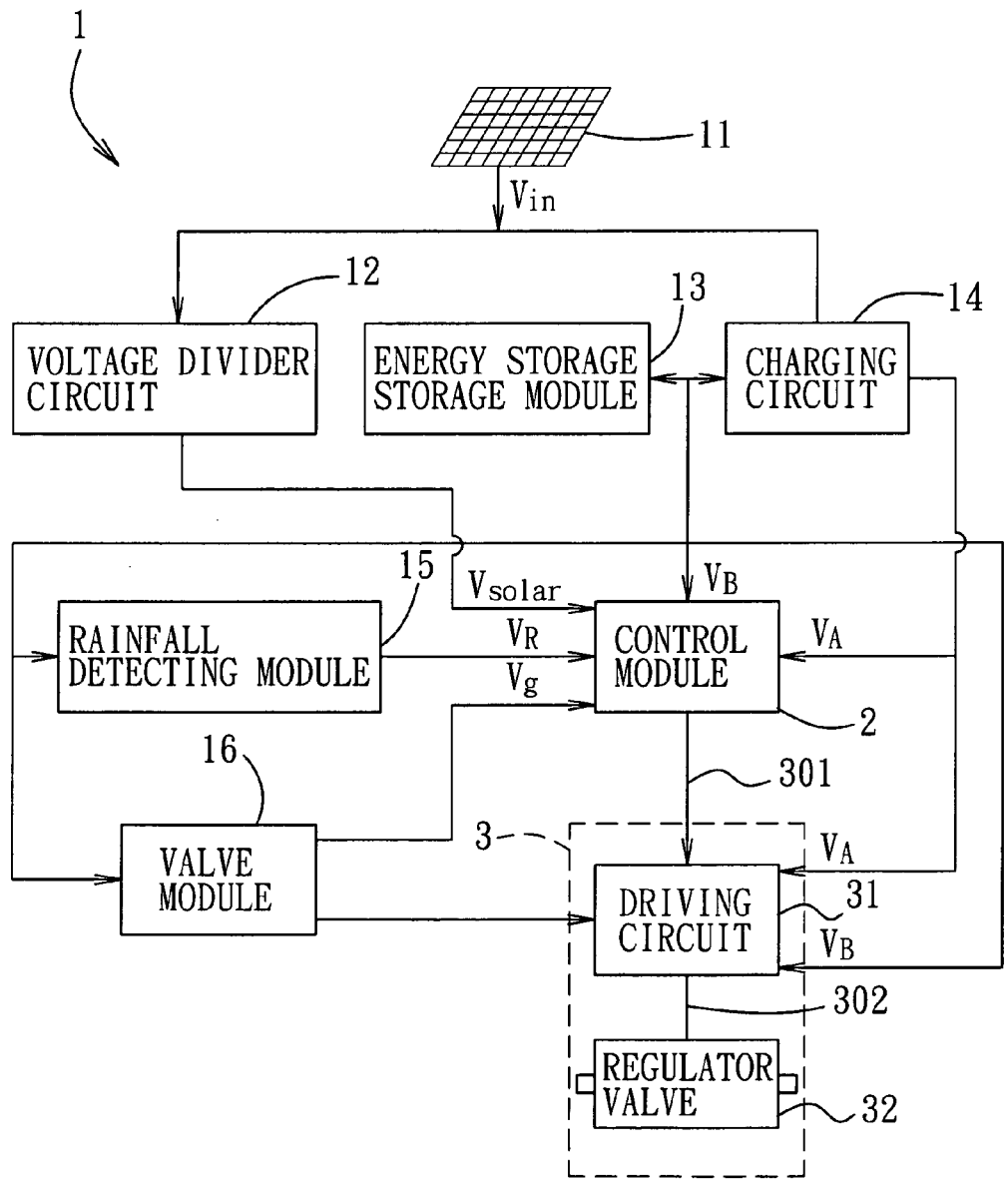
FIG. 1 is a system block diagram of the preferred embodiment of an automatic flow control apparatus according to the present invention.

Before the present invention is described in greater detail with reference to the accompanying preferred embodiments, it should be noted herein that like elements are denoted by the same reference numerals throughout the disclosure.

Figure 7:
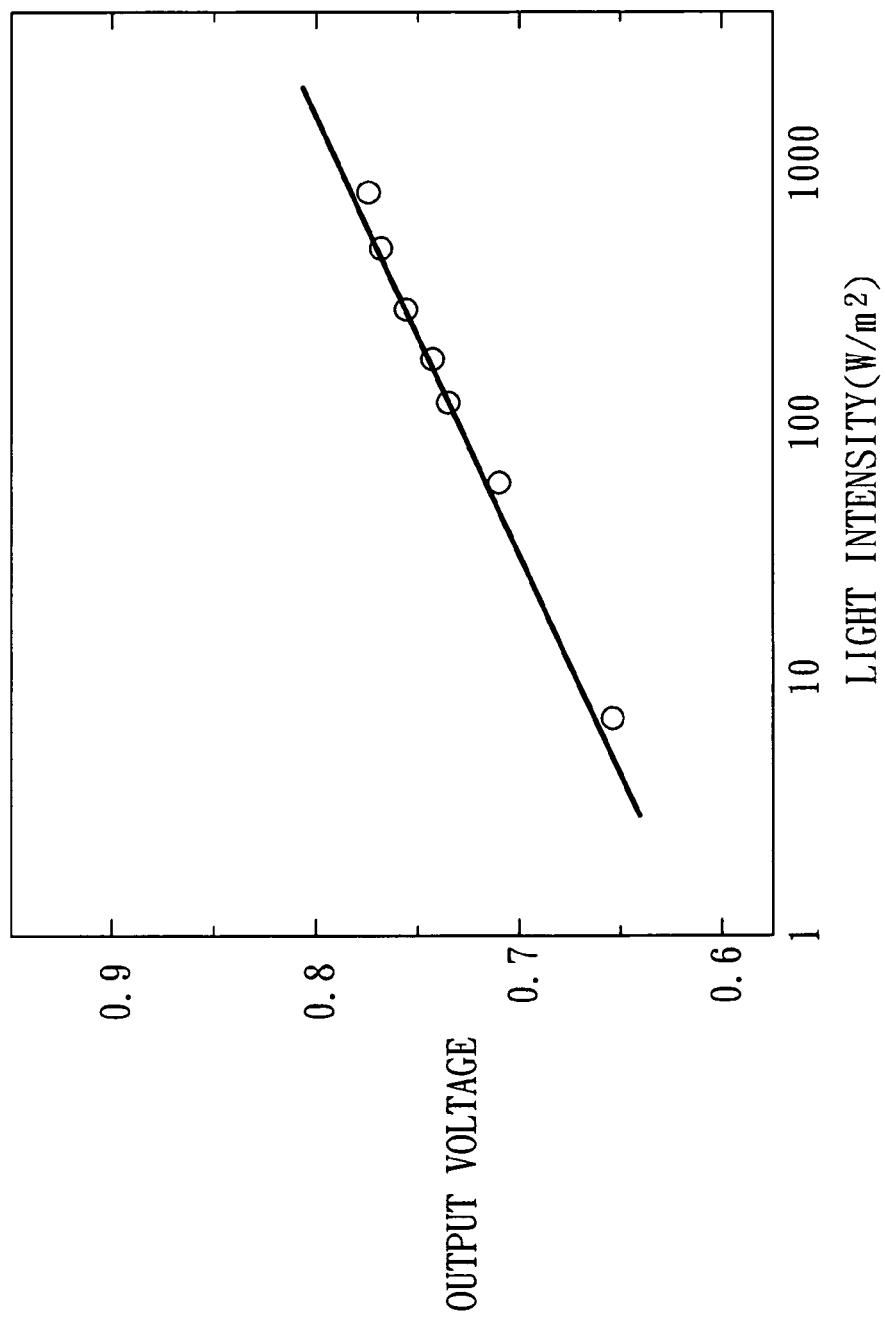
FIG. 7 is a graph illustrating voltages generated by a solar cell relative to light intensity.

Referring to FIG. 7, in a graph of the voltages generated by a solar cell versus light intensity, the solar cell generates higher voltages when the light intensity (unit: $W/m^2$) is greater.

Referring to FIG. 1, in the preferred embodiment of this invention, an automatic flow control apparatus 1 includes a solar cell 11, a voltage divider circuit 12, an energy storage module 13, a charging circuit 14, a rainfall detecting module 15, a user setting module 16, a regulating module 3 having a driving circuit 31 and a two-state regulator valve 32, and a control module 2 having an input interface 211 and an output interface 212 (see FIG. 2).

In this embodiment, the solar cell 11 is coupled to the voltage divider circuit 12 and the charging circuit 14, and cooperates with the voltage divider circuit 12 to form a solar cell module. The energy storage module 13 is coupled to the charging circuit 14. The voltage divider circuit 12, the charging circuit 14, the rainfall detecting module 15, the user setting module 16, and the energy storage module 13 are each coupled to the input interface 211 of the control module 2. The output interface 212 of the control module 2 is coupled to the driving circuit 31 of the regulating module 3, and the driving circuit 31 is coupled to the two-state regulator valve 32. The user setting module 16 is also coupled to the driving circuit 31 of the regulating module 3.

The solar cell 11 converts light energy into electricity (e.g., at an input voltage $V_{in}$). The charging circuit 14 uses the input voltage $V_{in}$ to charge the energy storage module 13, which stores the electricity to provide a stable electric power supply that is not affected by changes in weather conditions, such as between sunny and overcast days.

The driving circuit 31 of the regulating module 3 is responsive to a control signal 301 to generate a drive signal 302. The two-state regulator valve 32 is responsive to the drive signal 302 for regulating fluid flow.

Referring to FIG. 2, the control module 2 controls and coordinates operation of the components of the automatic flow control apparatus 1. In addition to the input interface 211 and the output interface 212, the control module 2 includes a controller 20, a timer 22, an analog-to-digital converter 23, a memory module 24, and a temperature detector 25. The controller 20 includes an analog control mode and a digital control mode. The memory module 24 includes a flash memory 241 and a random access memory 242.

Each of the components of the control module 2 may be coupled to the other components of the control module 2. In this embodiment, the analog-to-digital converter 23 is coupled to the controller 20 and the input interface 211. The memory module 24 is coupled to the controller 20.

The input interface 211 is configured to receive a received light signal $V_{solar}$ from the voltage divider circuit 12, a power supply voltage $V_A$ from the charging circuit 14, a detected rainfall signal $V_R$ from the rainfall detecting module 15, and a valve setting signal $V_g$ from the user setting module 16.

The controller 20 is configured to determine the state of the charging circuit 14 from the power supply voltage $V_A$. To determine temperature, the controller 20 receives a detected temperature signal from the temperature detector 25. To perform solar monitoring, the received light signal $V_{solar}$ output from the voltage divider circuit 12 is received through the input interface 211 and converted to measured light data using the analog-to-digital converter 23. The measured light data is recorded in the memory module 24. The controller 20 may control receipt of the received light signal $V_{solar}$ by the input interface 211, conversion of the received light signal $V_{solar}$ to measured light data using the analog-to-digital converter 23, and storage of the measured light data in the memory module 24.

Figure 3:
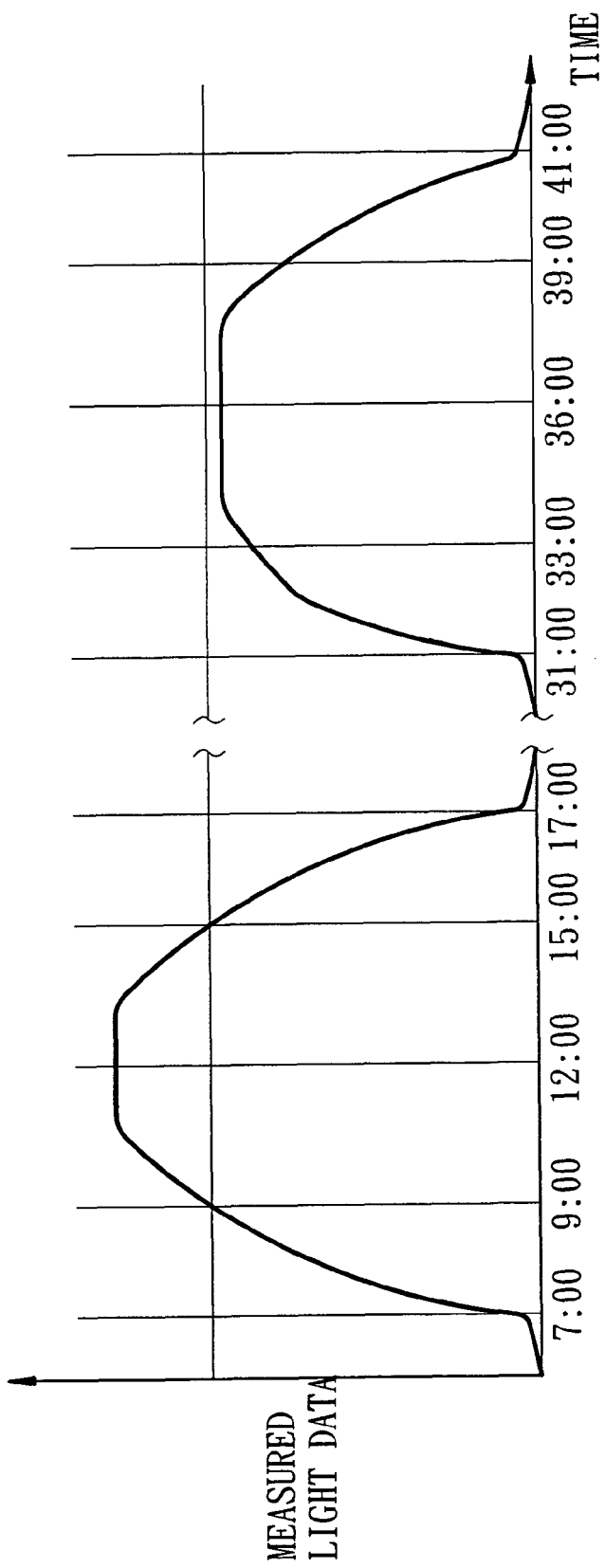
FIG. 3 is a graph of measured light data versus time.

Referring to FIG. 3, in an exemplary embodiment, an average light amount may be calculated from a 48 hour record of the measured temperature data derived from the received light signal $V_{solar}$. The average light amount may differ among sunny, rainy, and stormy days and between seasons.

Rainfall monitoring may be performed by using the input interface 211 to obtain the detected rainfall signal $V_R$ from the rainfall detecting module 15. The analog-to-digital converter 23 is then used to convert the detected rainfall signal $V_R$ into measured rainfall data that is subsequently recorded in the memory module 24. The controller 20 may be used to control receipt of the detected rainfall signal $V_R$ by the input interface 211, the conversion of the detected rainfall signal $V_R$ into measured rainfall data by the analog-to-digital converter 23, and the storage of the measured rainfall data in the memory module 24.

Referring to FIG. 4, in an exemplary embodiment, an average rainfall amount may be calculated from a 48 hour record of the measured rainfall data derived from the detected rainfall signal $V_R$. The average rainfall amount may be higher during rainy days, and lower during sunny days.

The user setting module 16 may provide the valve setting signal $V_g$ that is received using the input interface 211. The user setting module 16 may enable a user to adjust a valve setting through adjustment of a variable resistor (VR1).

In the preferred embodiment, the controller 20 when operating in a normal mode computes a fluid output based on the measured light data, the measured rainfall data, the measured temperature data, and the valve setting. The measured light data, the measured rainfall data, and the measured temperature data may be acquired over first, second, and third periods of time, respectively. The valve setting may include a time constant, and the fluid output may be determined by multiplying the time constant of the valve setting by a fluid supply period determined from the measured light, rainfall, and temperature data. Based on the fluid output, the controller 20 determines whether to output the control signal 301 through the output interface 212 to the regulating module 3 for controlling regulation of the fluid flow by the regulator valve 32.

Figure 5:
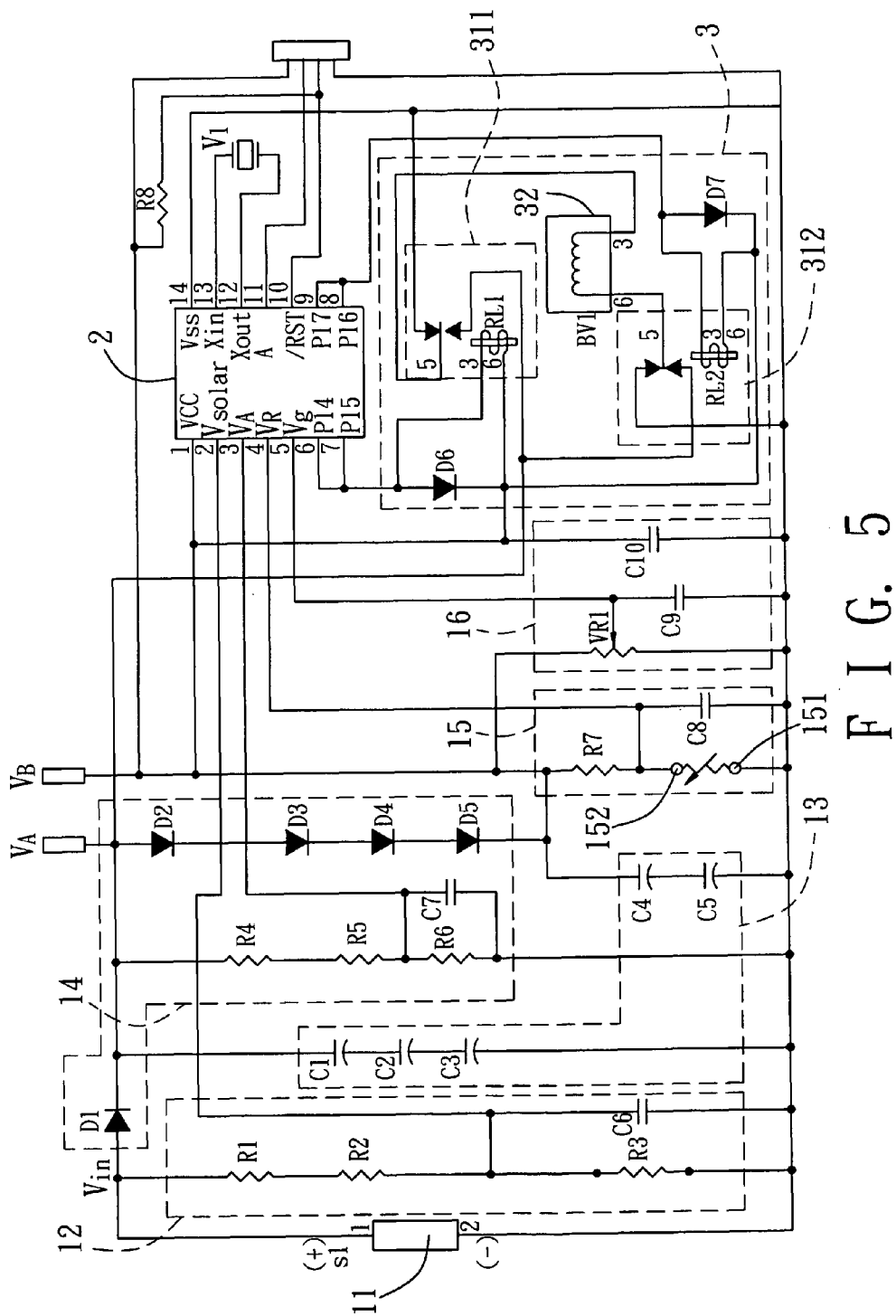
FIG. 5 is a circuit diagram of the preferred embodiment.

FIG. 5 is a circuit diagram illustrating components of the automatic flow control apparatus 1. The solar cell 11 is configured to convert light energy into electricity to generate the input voltage $V_{in}$.

The voltage divider circuit 12 has voltage divider resistors (R1~R3) and a capacitor (C6). The resistors (R1, R2, R3) are disposed in series, and the resistor (R3) is connected in parallel with the capacitor (C6). The voltage divider circuit 12 conducts voltage division for the input voltage $V_{in}$ to generate the received light signal $V_{solar}$ for subsequent receipt by the control module 2.

The charging circuit 14 has diodes (D1~D5), resistors (R4~R6) and a capacitor (C7). The diode (D1) permits the electricity generated by the solar cell 11 to flow to the resistors (R4~R6) and the capacitor (C7). The diode (D1) also prevents electricity from flowing in the reverse direction when the input voltage $V_{in}$ output by the solar cell 11 is lower than the power supply voltage $V_A$.

The energy storage module 13 uses super capacitors (C1~C5). The super capacitors (C1~C3) receive the electricity generated by the solar cell 11, and may be used to generate the power supply voltage $V_A$ for use by the two-state regulator valve 32. The super capacitors (C4~C5) receive the electricity from the solar cell 11 after it passes through the diodes (D1~D5), which reduces the power supply voltage $V_B$ to a level appropriate for use by the control module 2.

The rainfall detecting module 15 has two conductors 151, 152 extending vertically, a resistor (R7) and a capacitor (C8). The two conductors 151, 152 are used to measure rainfall. When not electrically connected by fluid, an open circuit exists between the conductors 151,152. When fluid is present, the fluid and the conductors 151,152 form a variable resistor connected in parallel with the capacitor (C8) to generate the detected rainfall signal $V_R$. The resistance of the variable resistor corresponds to the level of the fluid.

The user setting module 16 includes capacitors (C9, C10) and an adjustable resistor (VR1). Controlling the resistance of the adjustable resistor (VR1) may permit a user to tune the operation of the two-state regulator valve 32. Based on the setting of the adjustable resistor (VR1), the user setting module 16 outputs the valve setting signal $V_g$.

Figure 6:
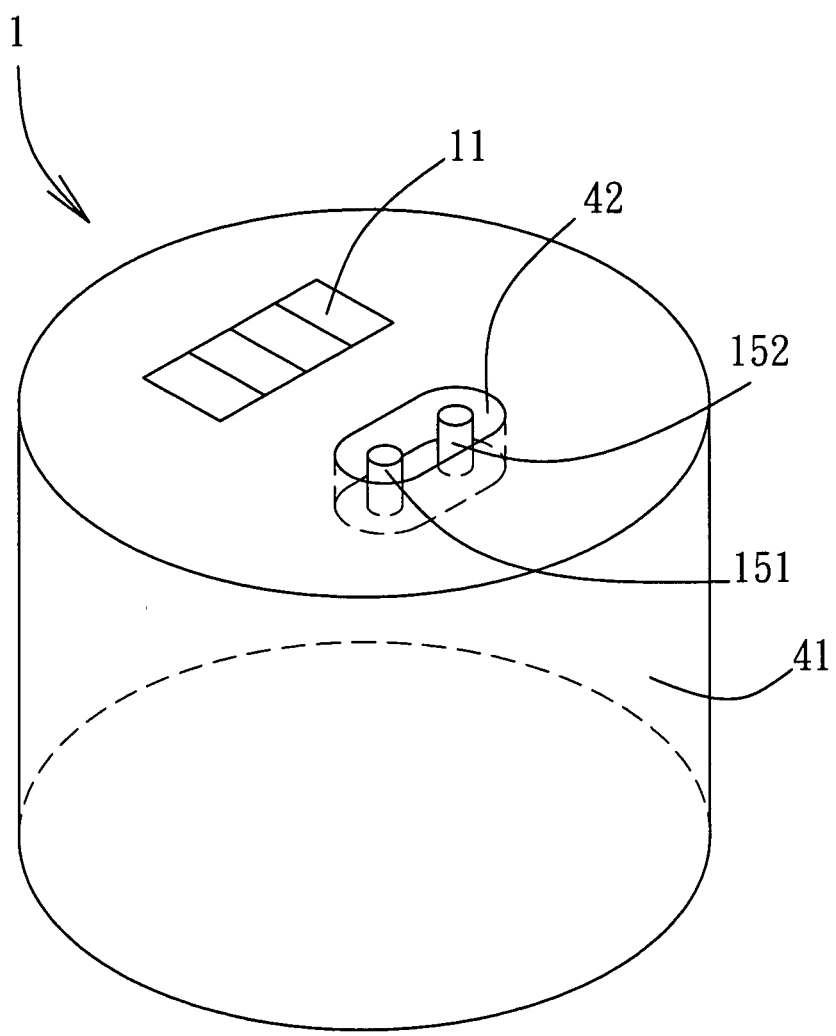
FIG. 6 is a perspective view of a housing for the preferred embodiment.

Referring to FIG. 6, the automatic flow control apparatus 1 has a housing 41 that includes a top surface formed with a recess 42 for storing precipitation. The pair of conductors 151, 152 extend vertically in the recess 42, and the solar cell 11 and the conductors 151, 152 are accessible from the top of the housing 41. The housing 41 is used for containing circuit components, and may be water-proof.

In this embodiment, the two conductors 151, 152 are a pair of conductive columns for measuring collected precipitation, such as from rainfall or dew. The resistance between the conductors 151, 152 corresponds to the fluid level between the conductors 151, 152, and the detected rainfall signal $V_R$ corresponds to the resistance between the conductors 151, 152. The controller 20 is therefore capable of determining the amount of precipitation based on the detected rainfall signal $V_R$.

Referring again to FIG. 2 and FIG. 5, the conductors 151, 152 are configured to be at a short-circuit state when the conductors 151, 152 are interconnected by a bridging conductor (not shown), such as a metallic object. The controller 20 is further configured to operate in an adjustment mode, in which the controller 20 generates the control signal according to the valve setting, when the short-circuit state is detected by the controller 20. When the conductors 151, 152 are short-circuited, the controller 20 detects the short-circuit through the detected rainfall signal $V_R$ received by the input interface 211. When the short-circuit state is detected, the controller 20 operates in the adjustment mode and computes the fluid output based only on the valve setting.

The valve setting may be determined by converting the valve setting signal $V_g$ to a digital value using the analog-to-digital converter 23. Assuming the resolution of the analog-to-digital converter 23 is 8 bits, then the valve settings may range between 1 and 255 seconds, and the controller 20 may be configured to control operation of the driving circuit 31 and the regulator valve 32 to allow fluid flow for the time period that corresponds to the valve setting. For example, when the conductors 151, 152 are short-circuited to trigger the controller 20 to retrieve the valve setting to control the fluid flow, the user can manually tune the adjustable resistor (VR1) to change the valve setting and to adjust fluid flow regulation by the controller 20.

In this embodiment, the driving circuit 31 has a first driving unit 311 and a second driving unit 312. In response to the control signal 301 from the control module 2, the first driving unit 311 and the second driving unit 312 open and close the two-state regulator valve 32 according to Table 1.

TABLE 1

| P14/P15 | P16/P17 | Two-state regulator valve |
|---------|---------|---------------------------|
| 0 | 0 | Undefined |
| 0 | 1 | On-control (open) |
| 1 | 0 | Off-control (closed) |
| 1 | 1 | Normal State |

Referring to Table 1, when not in operation the two-state valve 32 is in the normal state, which consumes no power. After receiving the on-control signal 301, the two-state regulator valve 32 is opened, and upon receiving the off-control signal 301, the two-state regulator valve 32 is closed. This mechanism has low power consumption, which facilitates power conservation.

The automatic flow control apparatus 1 may be utilized to control fluid flow for an automatic garden watering apparatus. The received light signal $V_{solar}$ may allow a user to avoid the cost of a separate light sensing device used for long-term solar monitoring. The automatic flow control apparatus 1 may further enable long-term rainfall monitoring by including the rainfall detecting module 15, which permits acquisition of the detected rainfall signal $V_R$. By recording weather data over periods of time and conducting automatic watering operations at the most appropriate time based on the recorded weather data, the cost of manual monitoring, and adjustment of fluid flow can be reduced or eliminated.

The automatic flow control apparatus 1 may also be used for controlling fluid flow of a bathroom appliance, such as a urinal, a toilet, a sink, a shower, or a tub.

The control device 2 may use the received light signal $V_{solar}$ to replace a conventional light sensor or switch to control fluid flow for a flushing operation. For example, the controller 20 may be configured such that when the received light signal $V_{solar}$ transitions from a masked state to an unmasked state (e.g., from receiving less light to receiving more light) within a first predetermined time period, the controller 20 determines an interruption of the receipt of light energy by the solar cell 11 has occurred. The controller 20 then performs a flushing operation by causing the driving circuit 31 to drive the regulator valve 32 to permit fluid flow through the regulator valve 32. Flushing may be prevented if the determination is otherwise, such as when the solar cell 11 continuously remains in a masked or unmasked state for the duration of the first predetermined time period.

The automatic flow control apparatus 1 may also control fluid flow of a rooftop sprinkler apparatus for reducing temperatures during the summer. For example, the controller 20 may be configured to maintain a preset temperature, to monitor the detected temperature signal from the temperature detector 25 to collect measured temperature data during a third predetermined time period, and to use the received light signal $V_{solar}$ to determine whether the device is operating during the day. The controller 20 may be further configured to determine whether a value of the measured temperature data obtained during the third predetermined time period exceeds a preset threshold. The controller 20 controls the driving circuit 31 such that the driving circuit 31 drives the regulator valve 32 to permit fluid flow through the regulator valve 32 when the determination result is affirmative, and stops fluid flow through the regulator valve 32 when the determination result is otherwise.

In summary, some advantages of the automatic flow control apparatus 1 in one or more embodiments of the present invention include:

1. automatic operation, which may reduce labor costs;
2. collection of solar energy, which may be used to operate the automatic flow control apparatus 1, and storage of excess energy in super capacitors, which may have reduced environmental impact compared to conventional chemical batteries;
3. rainfall detection, which may permit fluid to be supplied in optimal amounts based on rainfall patterns; and
4. temperature detection, which may permit water to be supplied based on rainfall patterns.

While the present invention has been described in connection with what are considered the most practical and preferred embodiments, it is understood that this invention is not limited to the disclosed embodiments but is intended to cover various arrangements included within the spirit and scope of the broadest interpretation to encompass all such modifications and equivalent arrangements.

What is claimed is:

1. An automatic flow control apparatus comprising:
   a solar cell module that converts received light energy into electricity, and that provides a received light signal corresponding to the received light energy;
   an energy storage module for storing and supplying electricity;
   a charging circuit that is coupled to said solar cell module and said energy storage module and that charges said energy storage module using the electricity from said solar cell module;
   a regulating module including a driving circuit and a regulator valve, said driving circuit being responsive to a control signal to generate a drive signal, and said regulator valve being coupled to said driving circuit and responsive to the drive signal for regulating fluid flow;
   a control module including
      a controller,
      an input interface configured to receive the received light signal from said solar cell module,
      an analog-to-digital converter coupled to said controller and said input interface and controlled by said controller to convert the received light signal from said input interface into measured light data,
      a memory coupled to said controller and configured for storing a measured data set that includes the measured light data obtained during a first predetermined time period, and
      an output interface coupled to said driving circuit;
   a rainfall detection module coupled to said input interface and configured to generate a detected rainfall signal receivable by said input interface;
   a housing that includes a top surface formed with a recess for storing precipitation; and
   a pair of conductors extending vertically in said recess and being configured to have a resistance therebetween that varies according to a fluid level in said recess, wherein the detected rainfall signal corresponds to the resistance, wherein said controller is configured to operate in a normal mode to determine based on at least the measured data set in said memory whether to output the control signal through said output interface to said regulating module for controlling regulation of the fluid flow b said regulator valve, wherein said analog-to-digital converter is further controlled by said controller to convert the rainfall detection signal into measured rainfall data, and wherein the measured data set stored in said memory further includes the measured rainfall data obtained during a second predetermined time period.

2. The automatic flow control apparatus as claimed in claim 1, wherein:

said conductors are configured to be at a short-circuit state when said conductors are interconnected by a bridging conductor, and said controller is further configured such that said controller operates in an adjustment mode, in which said controller generates the control signal according to a valve setting, when the short-circuit state is detected by said controller.

3. The automatic flow control apparatus as claimed in claim 1, wherein said housing contains at least one of said energy storage module, said charging circuit, and said control module.

4. The automatic flow control apparatus as claimed in claim 1, further comprising a temperature detector that is coupled to said controller and that is for providing measured temperature data, the measured data set stored in said memory further including the measured temperature data obtained during a third predetermined time period.

5. The automatic flow control apparatus as claimed in claim 4, the fluid flow to be provided to a water sprinkler system, wherein:

said controller is configured to determine whether a value of the measured temperature data obtained during the third predetermined time period exceeds a preset threshold, said controller controlling said driving circuit such that said driving circuit drives said regulator valve to permit fluid flow through said regulator valve when a determination result is affirmative, and stops fluid flow through said regulator valve when the determination result is otherwise.

6. The automatic flow control apparatus as claimed in claim 1, further comprising a user setting module coupled to said input interface and operable to provide a valve setting, said controller being configured to operate in the normal mode to determine based on the measured data set and the valve setting whether to output the control signal through said output interface to said regulating module.

7. The automatic flow control apparatus as claimed in claim 1, wherein said energy storage module includes at least one super capacitor.

8. The automatic flow control apparatus as claimed in claim 1, the fluid flow to be provided to a bathroom appliance, wherein:

said controller is configured to determine whether a value of the measured light data obtained during the-first predetermined time period indicates interruption of a receipt of light energy by said solar cell module, said controller controlling said driving circuit such that said driving circuit drives said regulator valve to permit fluid flow through said regulator valve when a determination result is affirmative, and stops fluid flow through said regulator valve when the determination result is otherwise.

9. The automatic flow control apparatus as claimed in claim 1, wherein said solar cell module includes a solar cell that converts the received light energy into electricity, and a voltage-divider circuit that is connected across said solar cell and that provides the received light signal.

* * * * *